No. 792,516. PATENTED JUNE 13, 1905.
S. M. & W. L. HANLON.
SEPARATOR.
APPLICATION FILED AUG. 25, 1904.

2 SHEETS—SHEET 2.

No. 792,516.    Patented June 13, 1905.

UNITED STATES PATENT OFFICE.

SAMUEL M. HANLON AND WILLIAM L. HANLON, OF STERLING, KANSAS.

SEPARATOR.

SPECIFICATION forming part of Letters Patent No. 792,516, dated June 13, 1905.

Application filed August 25, 1904. Serial No. 222,155.

*To all whom it may concern:*

Be it known that we, SAMUEL M. HANLON and WILLIAM L. HANLON, citizens of the United States, residing at Sterling, in the county of Rice and State of Kansas, have invented certain new and useful Improvements in Separators; and we do declare the following to be a full, clear, and exact description of the invention, such as will enable others skilled in the art to which it appertains to make and use the same.

This invention relates to improvements in separators.

The object of the invention is to provide an air-blast straw-rack for separators, whereby the grain will be thoroughly separated from the straw and chaff.

A further object is to provide means whereby a blast of air may be directed against the straw at different points, and thus loosen up all straw and chaff that passes over the straw-rack.

With these and other objects in view the invention consists of certain novel features of construction, combination, and arrangement of parts, as will be more fully described, and particularly pointed out in the appended claims.

Figure 1:
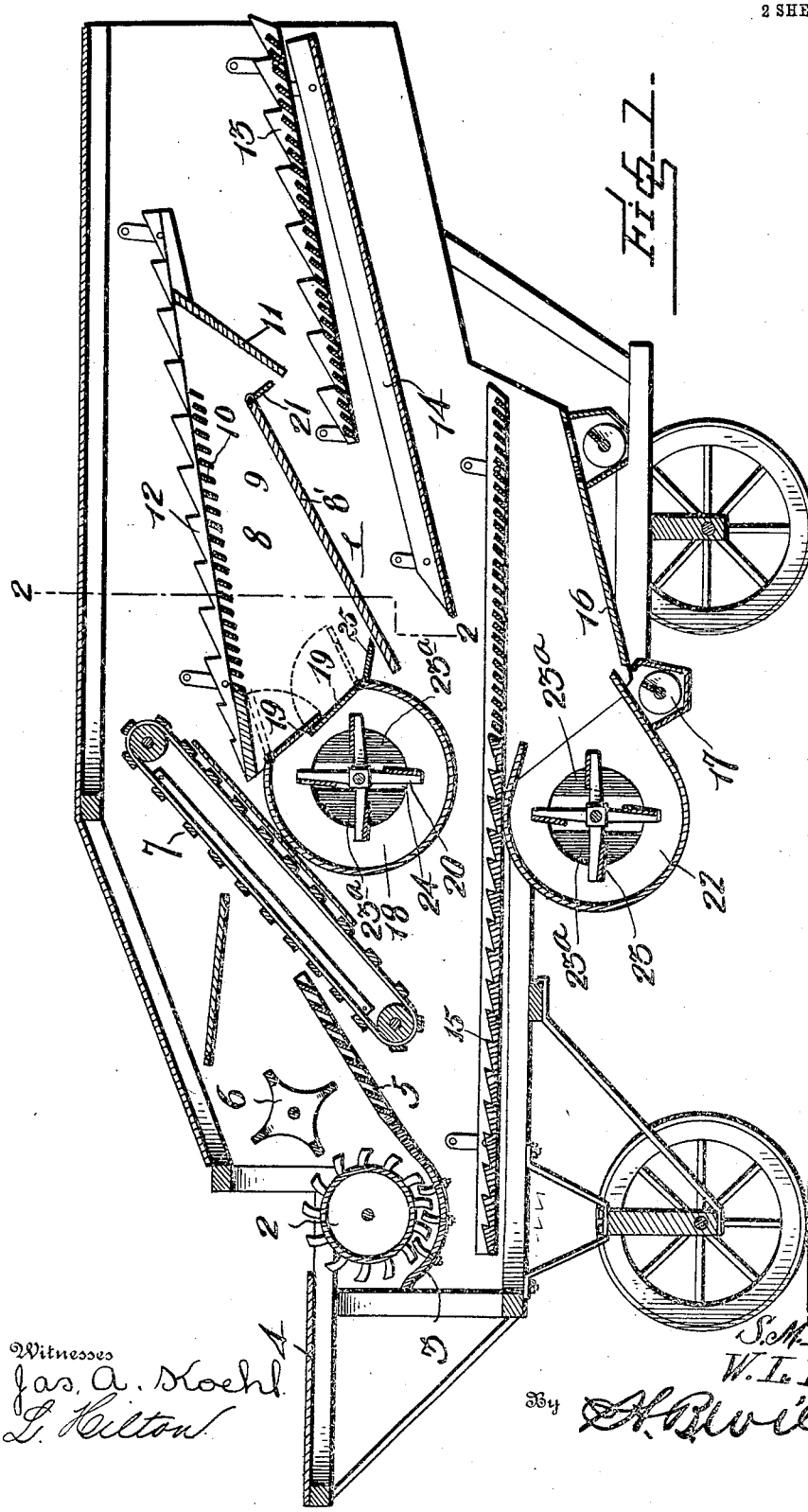
Figure 2:
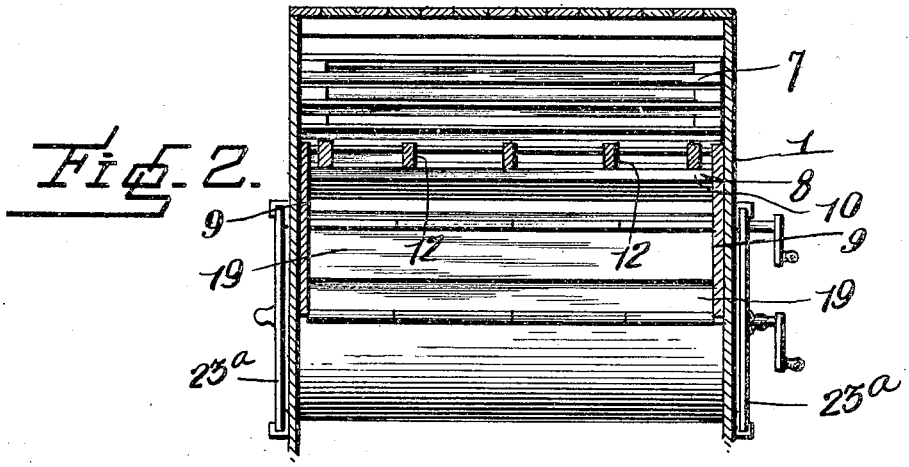
Figure 3:
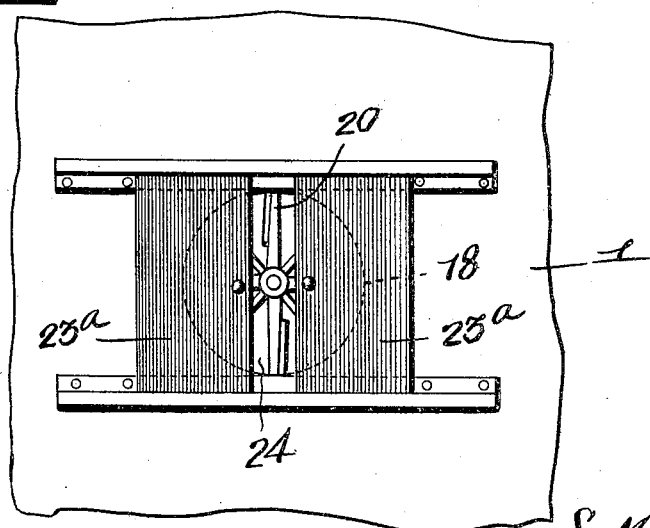

In the accompanying drawings, Figure 1 is a vertical longitudinal sectional view through a separator and showing the application of the invention. Fig. 2 is a vertical cross-sectional view on the line 2 2 of Fig. 1, and Fig. 3 is a side view of the air-blast fan.

Referring more particularly to the drawings, 1 denotes the frame or casing of a threshing-machine or separator, which may be of the usual or any suitable construction. Within said frame or casing, at the forward end of the same, is arranged the usual threshing-cylinder 2 and concave 3, to which the straw and grain are fed from the feed-table 4. From the concave 3 extends the grate 5, over which the straw is forced by the beater 6 after leaving the concave.

Arranged beneath the end of the grate 5 and extending upwardly and rearwardly from the same is an endless slatted conveyer or straw-rack 7, upon which the straw falls after leaving said grate and by which it is conducted to the air-blast straw-rack 8. The straw-rack 8 consists of an inclined frame having tapering side boards 9, which are pivotally connected to the sides of the separator-casing in any convenient manner. Between said side boards and at the upper edges of the same is arranged a grating 10, formed of a series of slats or strips spaced apart and arranged on a slight angle, so that the edges of the same overlap, as shown. At the rear end of the side boards 9 is arranged an inclined end board 11, which closes this end of the straw-rack frame. The straw-rack 8 is also provided with an inclined return-bottom 8', which catches the grain passing through the rack 8 and discharges the same from its lower end onto the grain-bottom 15. Above the grating 10 is arranged a series of longitudinally-disposed strips or bars 12, forming the upper side of the rack. There may be any desired number of the bars 12, five being found to be the most effective, the rear ends of the same being adapted to project rearwardly beyond the side pieces of the rack-frame and the grating 10, so that the grain and chaff which may have remained in the straw when the same reaches this point will fall through before the straw leaves the rack. The upper edges of the bars or strips 12 are notched in a zigzag manner, as shown, to facilitate the movement of the straw across the same.

Below the rear projecting ends of the strips 12 and extending to the rear end of the machine is a second upwardly-inclined straw-rack 13 and onto which the straw from said rack 8 falls. The straw then passes across this rack and is discharged at the rear end of the same, while any grain and chaff left therein falls through onto a downwardly-inclined upper return-bottom 14, by which it is conveyed forwardly and downwardly and dropped onto the slatted end of a grain-bottom 15, from which it falls, together with the rest of the grain caught by said bottom, onto a lower inclined return-bottom 16, by which it is conducted to a spiral or other form of conveyer 17, and thereby carried and deposited into bags or other suitable receptacles.

At the lower forward end of the straw-rack 8 is arranged a fan-casing 18, which opens into the frame of the rack 8 below the grating 10. To the upper and lower edges of the fan-casing opening are hinged air-deflecting plates or wind-boards 19, which may be adjusted to various angles to direct the air-blast from the fan to any portion of the straw-rack that may be desired. The plates or boards may be adjusted in any suitable manner, but are preferably adjusted by extending the hinge or pivot pins of the same through the sides of the separator-casing and providing them with suitable handles.

Within the casing 18 is mounted an air-blast fan 20, which may be driven in any suitable manner to create a strong blast of air which passes through the straw-rack and straw and blows the chaff and lighter particles of straw and dirt out. This air-blast also cleans the grain from the chaff as it falls through the grating 10 onto the bottom below.

At the upper rear end of the frame 8 is arranged an air-deflecting plate or wind-board 21, which is also hinged similarly to the wind-boards 19 to permit the same to be adjusted to regulate the course of the air at the rear end of the straw-rack. When in its lowered position, the free end of the wind-board 21 lies adjacent to but does not engage the end board 11, thereby forming a space or opening through which any grain may pass that has been blown through against the board 11 by the fan 20. On the ends of the fan-casing 18 are slidably mounted plates 23, which are adapted to be moved over the inlet-opening 24 in said ends to vary the size of the same, and thereby regulate the supply of air taken in by the fan and consequently control the amount of air discharged from the same onto the straw-rack.

The straw-racks and grain-bottoms of the separator may be oscillated or shaken in any suitable manner to force the straw and grain over the same.

To the fan-casing 18, adjacent to and immediately below the pivoted connection of the air-deflecting plates 19, is connected the upper edge of a stationary blast-retard board 25, the lower end of which lies three-fourths of an inch above the inclined return-bottom 8' of the air-blast straw-rack 8.

By the arrangement of the straw-racks and the forming of adjustable wind or air-deflecting boards, as herein described, the grain will be thoroughly separated from the straw and cleaned from all chaff and foreign matter.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. In combination with a threshing mechanism and a conveyer for the threshed grain, a rack on which the threshed grain is discharged and having openings for the passage of grain therethrough, a downwardly and forwardly inclined end board depending from the rear end of said rack, a similarly-inclined return-bottom under the said rack and terminating short of the said end board, to form a discharge-opening between them, a casing having a discharge-opening in one side between the front ends of the said rack and return-bottom, a blast-fan in said casing, and pivoted deflectors at the upper and lower sides of said opening, to be turned in position to close the same, open said opening to any desired extent, and to direct the blast from the fan upwardly and rearwardly under and to any portion of the rack, substantially as described.

2. In combination with a threshing mechanism and a conveyer for the threshed grain, a rack on which the threshed grain is discharged and having openings for the passage of grain therethrough, a downwardly and forwardly inclined end board depending from the rear end of said rack, a similarly-inclined return-bottom under the said rack and terminating short of the said end board, to form a discharge-opening between them, a retard-board spaced from and above the lower end of the return-bottom, and means to discharge a blast of air rearwardly over the retard-board and through the space between the rack and bottom, substantially as described.

In testimony whereof we have hereunto set our hands in presence of two subscribing witnesses.

SAMUEL M. HANLON.
WILLIAM L. HANLON.

Witnesses:
SAMUEL HAINES,
C. C. STAHL.